US012766414B2

(12) United States Patent
Otomo

(10) Patent No.: US 12,766,414 B2
(45) Date of Patent: Oct. 20, 2026

(54) INFORMATION PROCESSING METHOD, INFORMATION PROCESSING DEVICE, AND INSTRUCTIONS FOR INFORMATION PROCESSING

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 0 days.

(21) Appl. No.: 19/004,943

(22) Filed: Dec. 30, 2024

(65) Prior Publication Data

US 2025/0135349 A1 May 1, 2025

Related U.S. Application Data

(63) Continuation of application No. 18/077,235, filed on Dec. 8, 2022, now Pat. No. 12,226,698, which is a (Continued)

(30) Foreign Application Priority Data

Jul. 27, 2020 (JP) ................................ 2020-126870

(51) Int. Cl.
*G06Q 30/00* (2023.01)
*A63F 13/61* (2014.01)
(Continued)

(52) U.S. Cl.
CPC .............. *A63F 13/61* (2014.09); *A63F 13/85* (2014.09); *G06Q 30/0272* (2013.01)

(58) Field of Classification Search
None
See application file for complete search history.

(56) References Cited

U.S. PATENT DOCUMENTS

2008/0189175 A1* 8/2008 Chan .................. G06Q 30/0218 705/14.5
2008/0281704 A1* 11/2008 Shuhy ................ G06Q 30/0277 705/14.71
(Continued)

FOREIGN PATENT DOCUMENTS

EP 2833308 A1 * 2/2015 ......... G06Q 30/0242
JP 7533716 B2 8/2024
(Continued)

OTHER PUBLICATIONS

Almeida, Samuel. "The eyes and games: A survey of visual attention and eye tracking input in video games." (2011). (Year: 2011).*
(Continued)

*Primary Examiner* — Michael Bekerman
(74) *Attorney, Agent, or Firm* — Osha Bergman Watanabe & Burton LLP

(57) ABSTRACT

An information processing method includes: modifying a display screen of a touch panel to display, during a game, a merchandise advertisement screen and an end button that ends displaying the merchandise advertisement screen; detecting a timing of a start to display the end button; detecting a timing of a touch operation, on a touch sensor of the touch panel, on the end button; calculating a time period from the timing of the start to display the end button to the timing of the touch operation; calculating, based on the time period, a degree of scrutinization that indicates a degree to which a player has scrutinized an advertisement content; modifying an information of the player to include a rewarded game content, to be used in the game; and modifying the display screen to incorporate the rewarded game content into functionality of the game.

5 Claims, 7 Drawing Sheets

Related U.S. Application Data continuation of application No. PCT/JP2021/027244, filed on Jul. 20, 2021.

(51) Int. Cl.
*A63F 13/85* (2014.01)
*G06Q 30/0272* (2023.01)

(56) References Cited

U.S. PATENT DOCUMENTS

2013/0151333 A1* 6/2013 el Kaliouby ....... G06Q 30/0242 705/14.45
2014/0156364 A1* 6/2014 Zalewski ............. H04N 21/812 382/181
2014/0163706 A1* 6/2014 Wilen ................. G07F 17/3295 705/14.19
2014/0259043 A1* 9/2014 Hunter ................. H04N 21/812 725/23
2014/0340639 A1* 11/2014 Rust ....................... G06V 40/19 351/209
2015/0032519 A1* 1/2015 Brooks .............. G06Q 30/0209 705/14.12
2016/0063318 A1* 3/2016 Cheatham, III ... G06Q 30/0273 348/143
2016/0225016 A1* 8/2016 Patel .................. G06Q 30/0245
2017/0169662 A1* 6/2017 Froy .................. G06Q 30/0261
2018/0211285 A1* 7/2018 Todasco ............. G06Q 30/0277
2019/0034975 A1* 1/2019 Rizk ...................... G06F 3/0482
2019/0378164 A1* 12/2019 Eich ................. H04N 21/44204
2024/0205494 A1* 6/2024 Nellore .............. H04N 21/4223

FOREIGN PATENT DOCUMENTS

WO WO-2013119649 A1 * 8/2013 ....... H04N 21/44213
WO WO-2015031671 A1 * 3/2015 ......... G06Q 30/0261
WO WO-2019114955 A1 * 6/2019 ....... H04N 21/44222
WO WO-2020075084 A1 * 4/2020 ............. G06Q 30/02

OTHER PUBLICATIONS

Action issued in family Japanese Patent Application No. 2024-121727 mailed on Sep. 30, 2025 (8 pages).

* cited by examiner

FIG. 6A
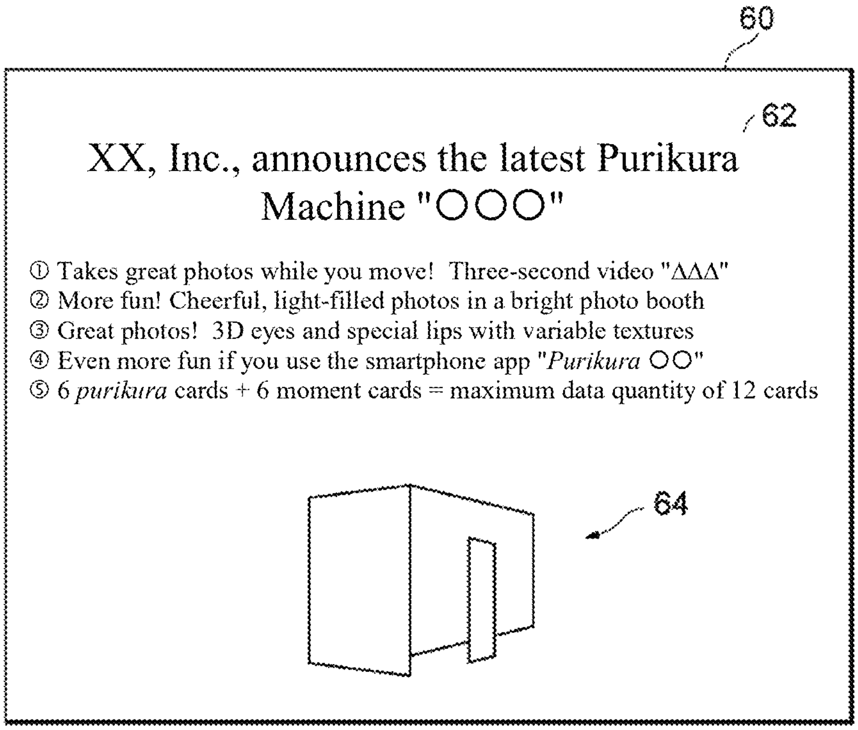
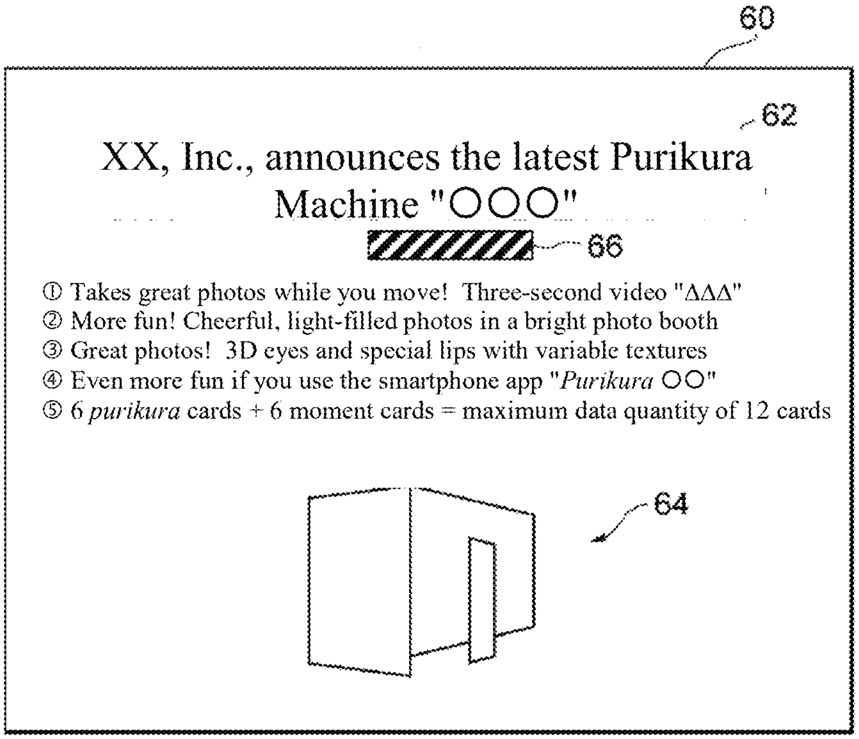
FIG. 6B

INFORMATION PROCESSING METHOD, INFORMATION PROCESSING DEVICE, AND INSTRUCTIONS FOR INFORMATION PROCESSING

BACKGROUND

Technical Field

The present invention relates to an information processing method, an information processing device, and instructions for information processing.

Description of the Related Art

Games are known in which advertisements are displayed within a game for merchandise or the like that are different from those for that game.

In relation to this, Patent Literature 1 discloses a technique in which an advertisement is displayed at a specific point within a game, and the player is provided with a reward for proceeding in the game in an advantageous manner.

PATENT LITERATURE

Patent Literature 1: JP-A 2018-027183

In such games, there is a sense of unfairness because each player is equally rewarded regardless of whether the player has scrutinized the advertisements.

SUMMARY

One or more embodiments provide a technological improvement over such conventional gaming devices. In particular, an information processing method, an information processing device, and instructions for information processing according to one or more embodiments can reduce the sense of unfairness on the part of a player who has scrutinized an advertisement. This provides a practical, technological improvement over conventional gaming devices that would be readily appreciated by those skilled in the art. Further details regarding the various improvements and advantages will become apparent from the descriptions that follow.

According to one or more embodiments, an information processing method comprises: modifying a display screen of a touch panel to display, during a game: a merchandise advertisement screen including an advertisement content for a merchandise that is unrelated to the game; and an end button that ends displaying the merchandise advertisement screen; detecting a timing of a start to display the end button; detecting a timing of a touch operation, on a touch sensor of the touch panel, on the end button; calculating a time period from the timing of the start to display the end button to the timing of the touch operation on the end button; calculating, based on the time period, a degree of scrutinization that indicates a degree to which a player has scrutinized the advertisement content; modifying an information of the player to include a rewarded game content, to be used in the game; and modifying the display screen to incorporate the rewarded game content into functionality of the game, wherein an amount or quality of the rewarded game content is proportional to the degree of scrutinization.

Also, according to one or more embodiments, an information processing device comprising a controller that: modifies a display screen of a touch panel to display, during a game: a merchandise advertisement screen including an advertisement content for a merchandise that is unrelated to the game; and an end button that ends displaying the merchandise advertisement screen; detects a timing of a start to display the end button; detects a timing of a touch operation, on a touch sensor of the touch panel, on the end button; calculates a time period from the timing of the start to display the end button to the timing of the touch operation on the end button; calculates, based on the time period, a degree of scrutinization that indicates a degree to which a player has scrutinized the advertisement content; modifies an information of the player to include a rewarded game content, to be used in the game; and modifies the display screen to incorporate the rewarded game content into functionality of the game, wherein an amount or quality of the rewarded game content is proportional to the degree of scrutinization.

Also, according to one or more embodiments, a non-transitory computer-readable medium storing instructions, wherein when the instructions are executed, the instructions cause a computer to execute operations comprising: modifying a display screen of a touch panel to display, during a game: a merchandise advertisement screen including an advertisement content for a merchandise that is unrelated to the game; and an end button that ends displaying the merchandise advertisement screen; detecting a timing of a start to display the end button; detecting a timing of a touch operation, on a touch sensor of the touch panel, on the end button; calculating a time period from the timing of the start to display the end button to the timing of the touch operation on the end button; calculating, based on the time period, a degree of scrutinization that indicates a degree to which a player has scrutinized the advertisement content; modifying an information of the player to include a rewarded game content, to be used in the game; and modifying the display screen to incorporate the rewarded game content into functionality of the game, wherein an amount or quality of the rewarded game content is proportional to the degree of scrutinization.

BRIEF DESCRIPTION OF THE DRAWINGS

FIG. 6A is a diagram showing an example of an advertisement screen according to one or more embodiments;

FIG. 6B is a diagram showing an example of an advertisement screen displaying objects according to one or more embodiments.

DETAILED DESCRIPTION

Figure 1:
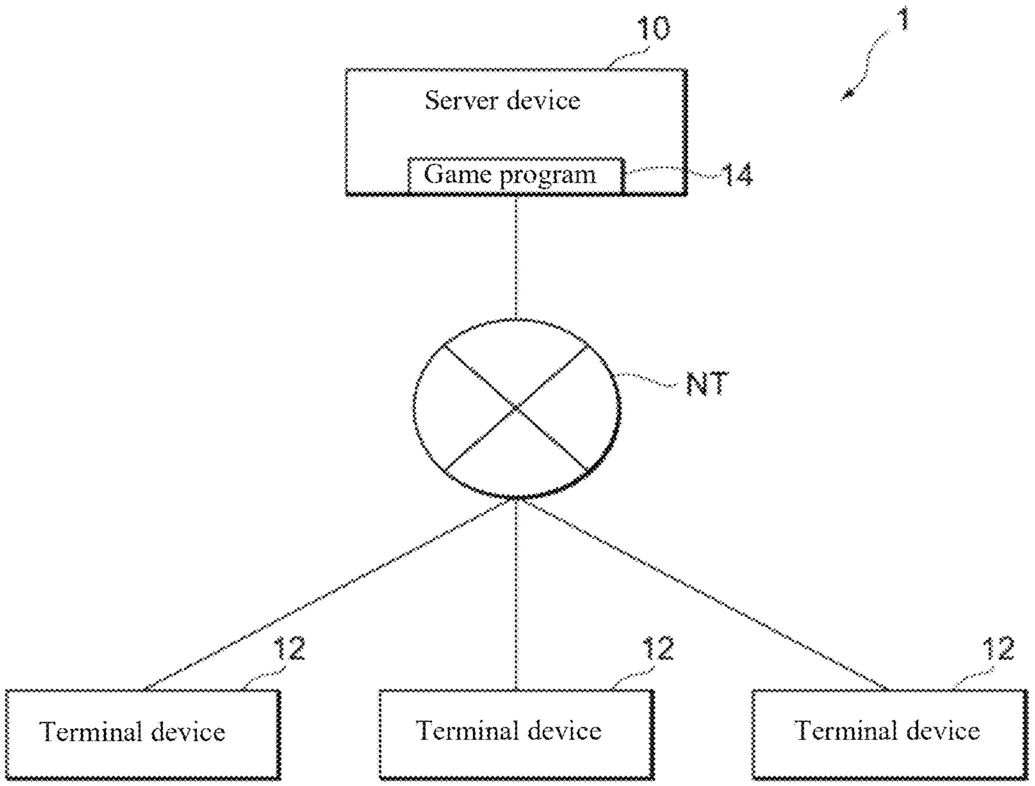
FIG. 1 is a block diagram showing an example of the overall configuration of a game system according to one or more embodiments.

Embodiments of the present invention will now be described with reference to the appended drawings. To facilitate understanding of the description, components and steps that are the same will be numbered the same as much as possible in the drawings, and redundant description will be omitted.

Overall Configuration

FIG. 1 is a block diagram showing an example of the overall configuration of a game system 1 according to one or more embodiments.

As shown in FIG. 1, a game system 1 comprises a server device 10 and one or more terminal devices 12. The server device 10 and terminal devices 12 are connected so as to be able to communicate via a communication network NT such as an intranet, the Internet, or a telephone line.

The server device 10 is an information processing device that provides the execution results of the game obtained by executing the game program (game instructions stored in a non-transitory computer-readable recording medium) 14, or the game program 14 itself, to the player of each terminal device 12 via the communication network NT. In one or more embodiments, the server device 10 provides the game program 14 itself to the players of the terminal devices 12.

Each terminal device 12 is an information processing device belonging to a player, and is an information processing device that provides a game to a player by executing the game program 14 received from the server device 10 after the program has been installed. Examples of these terminal devices 12 include video game machines, arcade game machines, mobile phones, smartphones, tablets, personal computers, and various other such devices.

Hardware Configuration

Figure 2:
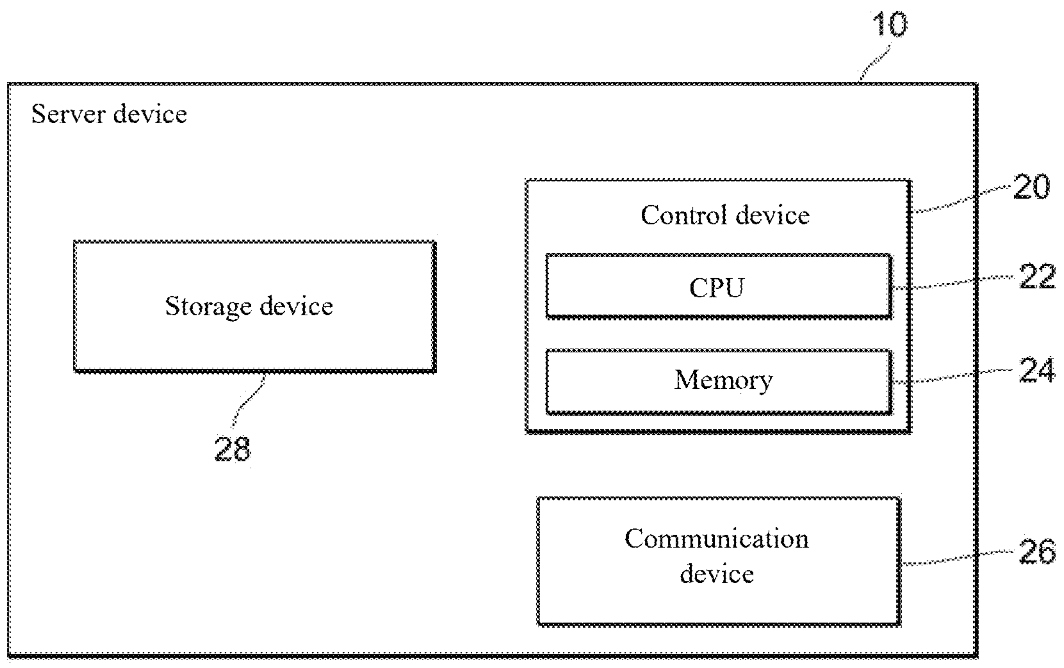
FIG. 2 is a diagram schematically showing an example of the hardware configuration of a server device according to one or more embodiments.

FIG. 2 is a diagram schematically showing an example of the hardware configuration of the server device 10.

As shown in FIG. 2, the server device 10 comprises a control device 20, a communication device 26, and a storage device 28. The control device 20 mainly comprises a CPU (central processing unit) 22 and a memory 24.

In the control device 20, the CPU 22 functions as various functional means by executing specific programs stored in the memory 24, the storage device 28, or the like. These functional means will be described in detail below.

The communication device 26 is constituted by a communication interface or the like for communicating with an external device. The communication device 26 sends and receives various kinds of information to and from the terminal device 12, for example.

The storage device 28 is constituted by a hard disk or the like. The storage device 28 stores various kinds of program and various kinds of information necessary for executing processing in the control device 20, including the game program 14, as well as information about processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10, except for comprising an operating means, a display device, and a sound output device, for example.

Figure 3:
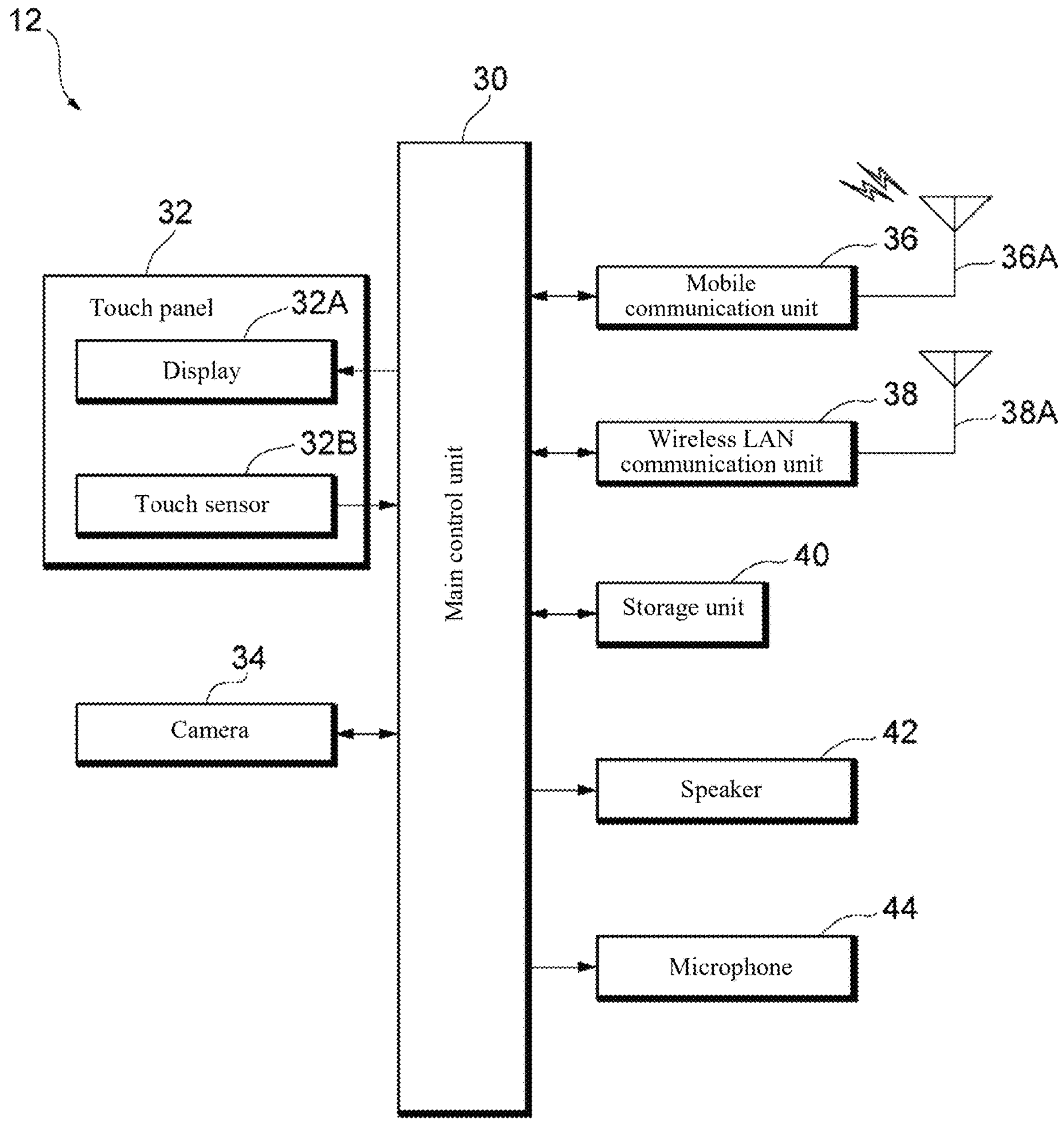
FIG. 3 is a diagram showing an example of the hardware configuration of a smart phone according to one or more embodiments, as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit 30, a touch panel (touch screen) 32, cameras 34 (in-camera/out-camera), a mobile communication unit 36, a wireless LAN communication unit 38, a storage unit 40, a speaker 42, and a microphone 44.

The main control unit 30 includes a CPU, a memory, and the like. This main control unit 30 is connected to the touch panel 32 (used as a display input device), the camera 34, the mobile communication unit 36, the wireless LAN communication unit 38, the storage unit 40, and the speaker 42. The main control unit 30 has the function of controlling these connected devices.

The touch panel 32 has both a display function and an input function, and is constituted by a display 32A that handles the display function, and a touch sensor 32B that handles the input function. In one or more embodiments, the display 32A can display game images including button images, a cross key image, a joystick image, and other such operation input images. The touch sensor 32B can sense the input position of the player with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The storage unit 40 stores various kinds of programs and data, such as the game program 14, and play data indicating player information or the progress of the game in the game program 14. This play data may be stored in the server device 10.

The speaker 42 has the function of outputting game sounds and so forth.

Game Overview

The game according to one or more embodiments includes lottery games, quests, and missions in which the player can acquire content (such as characters and various items). Lottery games are sometimes referred to as gacha (loot box), raffle, summoning, or the like. Quests are sometimes referred to as battle games, dungeons, searches, missions, or the like.

The lottery game according to one or more embodiments is a game in which a player acquires one or more characters selected at random from a group of characters to be selected, in response to an instruction (request) from a player to execute a lottery game. This lottery is executed on the basis of the consumption of items possessed by the player. Examples of such items include paid items (paid stones, paid tickets, etc.) and free items (free stones, free tickets, game coins, etc.). Paid items are items given to the player on the basis of payment in cash or by prepaid card, credit card, or the like. Free items have the same value as paid items, but are items given to the player free of charge in the game.

Also, a quest according to one or more embodiments is a game in which a team made up of one or more characters possessed by the player plays against enemy characters on the basis of an instruction (request) from the player to execute a quest. This quest is executed on the basis of the consumption of stamina associated with the player. Stamina is restored according to the use of stamina recovery items or the elapse of a specific length of time (such as three minutes). The player can acquire a clearance reward by clearing a quest. Clearance rewards include free items (such as free stones), enemy characters that have appeared in a quest, and experience values for increasing the player ranking.

Also, a mission according to one or more embodiments is a task or the like imposed on the player by the game operator, and the player can acquire a reward on the basis of accomplishing a mission. Examples of missions include viewing (browsing) advertisements for various merchandise and services, clearing a specific quest, reaching a certain player ranking, reaching a certain number of logins, and reaching a specific total value for consumed stamina. Examples of rewards include content that can be used in the game, and coupons (barcodes, gift codes, etc.) that can be used at stores and the like. Examples of this content include characters, free items, resource items for enhancing (evolving) characters, stamina recovery items, and items that can be used in quests (continuation items, etc.). This content may also be content that can be used in another game. Also, the rewards acquired by the player may be randomly determined according to a specific probability.

Functional Means

Figure 4:
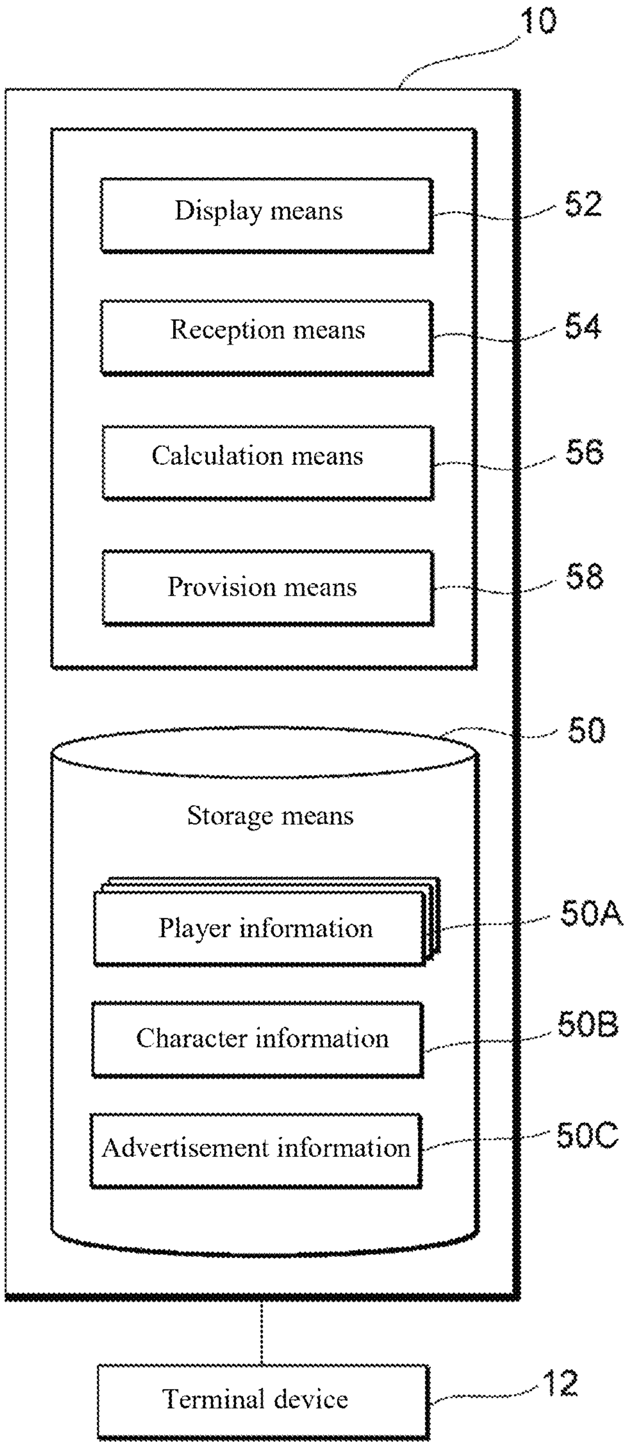
FIG. 4 is a block diagram showing an example of the functional configuration of a server device according to one or more embodiments.

FIG. 4 is a block diagram showing an example of the functional configuration of a server device 10.

As shown in FIG. 4, the server device 10 comprises a storage means 50, a display means 52, a reception means 54, a calculation means 56, and a provision means 58 as functional components. The storage means 50 here is realized by one or more storage devices 28. Functional means other than the storage means 50 are realized by causing a control device 20 to execute a game program 14 stored in the storage device 28 or the like.

The storage means 50 is a functional means for storing player information 50A, character information 50B, advertisement information 50C, and the like.

The player information 50A is stored for each player in association with the player ID of that player. The player information 50A includes, for example, the player's name, age, possessed character information, possessed item information, and degree of scrutinization.

Possessed character information includes the character ID and ability parameters of each character possessed by the player (possessed character). Ability parameters are, for example, a character's level, hit points, attack power, defense power, and the like. The level rises when a character acquires character experience values through fusion or the like with resource items. As the character's level increases, the hit points, attack power, defense power, and so forth also increase.

Possessed item information includes the number of items possessed by the player. Examples of these items include paid stones, paid tickets, free stones, and free tickets, resource items, and the like.

The degree of scrutinization includes the degree (numerical value) of scrutinization of the advertisement by the player.

The character information 50B is stored for each character in association with the character ID of that character. The character information 50B includes, for example, the name and an image (design) of the character, rarity, initial values for ability parameters (such as hit points, attack power, defense power, etc., at level 1), maximum values (such as hit points, attack power, defense power, etc., at level 100), skills, and the like.

Rarity includes numerical values from 1 to 6, for example. This numerical value is sometimes indicated by the number of stars, for example. Here, characters with high rarity are set to have ability parameters and skills that are advantageous for the game (such as in quests and missions).

The advertisement information 50C is stored for each advertisement in association with the advertisement ID of that advertisement. This advertisement information 50C includes, for example, the name of the advertiser, the name of the merchandise being advertised, advertisement data, object information, FAQ information, reward information, display count, and the like. Examples of this advertisement data include moving images, still images, applications for executing games, and the like. This advertisement data is displayed for 10 seconds, for example. Advertisements include, for example, text strings such as merchandise names, merchandise summaries, merchandise images, and the names of the companies that sell the merchandise. Merchandise also includes services. The object information includes object IDs, display information, and movement information about one or more objects displayed within an advertisement. Objects include marks, text, and the like. The display information includes the display position (coordinates) of an object within the advertisement display area, and the display timing. The display position is set, for example, near the merchandise name displayed in the advertisement display area (for example, a first object is near the beginning of the merchandise name). The display timing includes, for example, the timing (such as the number of seconds) at which an object is displayed while an advertisement is being displayed, and the timing at which a displayed object disappears. Movement information includes a specific position toward which a displayed object moves and the speed. This specific position is set, for example, to be all or part of the display area of an advertisement. For example, the specific position is set near the end of the merchandise name displayed in the advertisement display area. The FAQ information includes question information and answer information. The question information includes text strings and image data presented to the player as questions (inquiries) regarding advertisements. The answer information includes text strings (words), numerical values, symbols (options), etc., as answers to the questions. Reward information includes content provided to players on the basis of the display of advertisements. The display count includes the number (total number) of times an advertisement has been displayed on the terminal device 12 of each player.

The display means 52 is a functional means for displaying a game screen, an advertisement screen, or the like on a touch panel 32. In one or more embodiments, the display means 52 displays an advertisement within the game that is different from those for that game.

The display means 52 also displays one or more objects while an advertisement is being displayed. For example, the display means 52 refers to the display information of the advertisement information 50C, and displays an object below or behind the merchandise name shown in the advertisement display area.

The display means 52 also moves the display of the object toward a specific position. For example, the display means 52 refers to the movement information of the advertisement information 50C, and moves the display of a displayed object from near the beginning of the merchandise name shown in the advertisement display area toward near the end (specific position). This specific position is represented, for example, on the screen by a circular or polygonal area, a line segment, or the like.

Also, the display means 52 displays questions about an advertisement according to the display of that advertisement. For example, the display means 52 refers to the FAQ information (question information) of the advertisement information 50C, and displays an image showing a question related to the advertisement. Examples of this question include a question (inquiry) that prompts the user to give an answer about all or part of a merchandise name, a merchandise summary, or a merchandise image.

The reception means 54 is functional means for receiving an input instruction from the player. In one or more embodiments, the reception means 54 receives from the player an operation input or an audio input with respect to an object. Operations includes a touch operation, a tap operation, a slide operation, a flick operation, a long press, etc., on the touch panel 32. Audio includes sounds generated by the player (such as his voice or a clap).

The reception means 54 also receives from the player an input instruction for an answer to a question about the content of the advertisement displayed by the display means 52. This answer is, for example, a text string (word), a numerical value, a symbol (selection tree), or the like.

The calculation means 56 is a functional means for calculating various numerical values. In one or more embodiments, the calculation means 56 calculates a degree of scrutinization indicating the degree to which the player has scrutinized an advertisement. The degree of scrutinization includes, for example, a numerical value from 0 to 100, and the higher is the numerical value, the more scrutinized is the advertisement.

Also, the calculation means 56 calculates the degree of scrutinization according to the timing at which the player's input instruction for an object is received. For example, the calculation means 56 calculates the degree of scrutinization to be higher in proportion to how well the timing at which the object is displayed by the display means 52 matches the timing at which the input instruction is received by the reception means 54. More specifically, the calculation means 56 increases the degree of scrutinization by 10 if a touch operation is performed at the display position where the object is displayed within 0.2 seconds from the timing at which the object is displayed, and increases the degree of scrutinization by 5 if a touch operation is performed at the display position where the object is displayed within 0.4 seconds from the above-mentioned timing. In this case, a total of 10 objects are displayed.

Also, the calculation means 56 calculates the degree of scrutinization to be higher in proportion to how well the timing at which the object whose display is moved reaches a specific position matches the timing at which an input instruction is given. For example, the calculation means 56 calculates the degree of scrutinization to be higher in proportion to how well the timing at which an object whose display has been moved toward a specific position by the display means 52 reaches the specific position matches the timing at which the input instruction is received by the reception means 54. More specifically, the calculation means 56 increases the degree of scrutinization by 10 if a touch operation is performed at the specific position within 0.2 seconds from the timing at which the object reaches the specific position, and increases the degree of scrutinization by 5 if a touch operation is performed at the specific position within 0.5 seconds from the above-mentioned timing. In this case, the displays of a total of 10 objects are moved.

Also, the calculation means 56 calculates the degree of scrutinization according to the answer received from the player. For example, the calculation means 56 refers to the FAQ information (answer information) of the advertisement information 50C, and increases the degree of scrutinization by 50 if the player's answer received by the reception means 54 is correct. In this case, a total of two questions are displayed.

Also, the calculation means 56 calculates the degree of scrutinization to be higher in proportion to how long the player spends looking at the advertisement. For example, while the advertisement is being displayed, the degree of scrutinization is set to 100 if the duration that the eye (pupil) of the player captured by the camera (in-camera) 34 to be scrutinizing the advertisement is at least 8 seconds, the degree of scrutinization is set to 50 if the duration is at least 5 seconds and less than 8 seconds, and the degree of scrutinization is set to 0 if the duration is less than 5 seconds. In this case, the advertisement display duration is 10 seconds.

The provision means 58 is functional means for providing content to the player. In one or more embodiments, the provision means 58 provides the player with content (rewards) that can be used in the game on the basis of the display of advertisements. For example, the provision means 58 prioritizes the provided content in proportion to the degree of scrutinization calculated by the calculation means 56. This prioritization is, for example, to increase the amount of the content or to increase the quality of the content. For example, the provision means 58 provides five free stones if the degree of scrutinization is 100, provides three free stones if the degree of scrutinization is at least 50 and less than 100, and provides one free stone if the degree of scrutinization is 0 or more and less than 50. Also, the provision means 58 provides a character with a rarity of 5 if the degree of scrutinization is 100, provides a character with a rarity of 4 if the degree of scrutinization is at least 50 and less than 100, and provides a resource item if the degree of scrutinization 0 or more and less than 50.

Processing Flow

Figure 5:
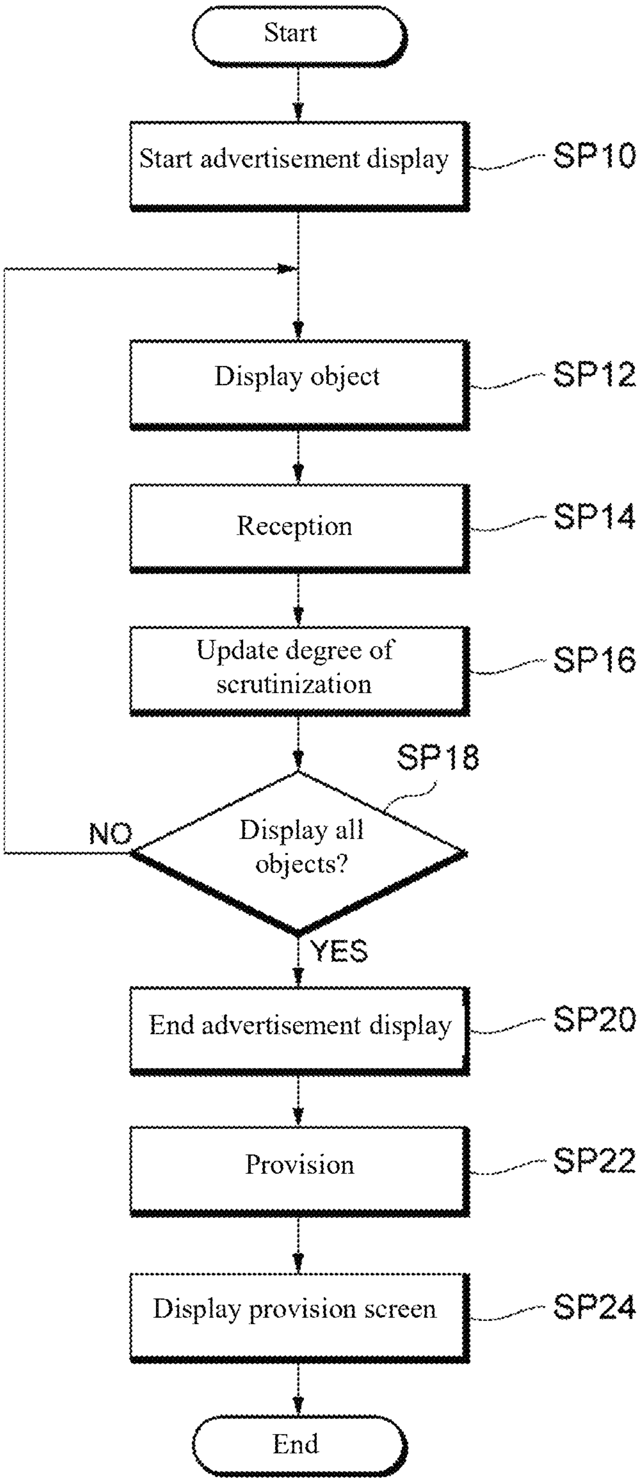
FIG. 5 is a flowchart showing an example of the flow of processing performed by the functional means shown in FIG. 4 in the game system according to one or more embodiments.

FIG. 5 is a flowchart showing an example of the flow of processing performed by the functional means shown in FIG. 4 in the game system according to one or more embodiments. The processing in the following steps is started, for example, at the timing at which the player performs an input operation for looking at or listening to an advertisement from the mission menu screen. The order and details of the following steps can be changed as needed.

Step SP10

The display means 52 displays the advertisement screen 60 on the touch panel 32. For example, the display means 52 refers to the advertisement information 50C and reproduces advertisement data (such as still pictures) corresponding to advertisements that have been displayed only a few times.

FIG. 6A is a diagram showing an example of the advertisement screen 60 according to one or more embodiments.

As shown in FIG. 6A, the advertisement screen 60 is provided with a merchandise description area 62 and a merchandise image area 64. In the merchandise description area 62, the name of the merchandise, a summary of the merchandise, the name of the company that sells the merchandise, and so forth are displayed. An image of the merchandise is displayed in the merchandise image area 64.

Returning to FIG. 5, the processing moves to the processing of step SP12.

Step SP12

The display means 52 displays an object in the advertisement displayed in step SP10.

FIG. 6B is a diagram showing an example of the advertisement screen 60 on which an object is displayed according to one or more embodiments.

As shown in FIG. 6B, the advertisement screen 60 is provided with a merchandise description area 62, a merchandise image area 64, and an object 66. The object 66 is displayed near (below, etc.) the merchandise name, for example.

Returning to FIG. 5, the processing moves to the processing of step SP14.

Step SP14

The reception means 54 receives input instructions from the player. For example, the reception means 54 receives a touch operation from the player on the object displayed in step SP12. The reception means 54 assumes that there is no input instruction from the player when a specific length of time (such as 0.5 seconds) has elapsed since the object was displayed in step SP12. The processing then moves to the processing of step SP16.

Step SP16

The calculation means 56 updates (calculates) the degree of scrutinization by the player. For example, the calculation means 56 updates the degree of scrutinization in the player information 50A according to the how long it is from the timing at which the object is displayed in step SP12 until the timing at which the player performs the touch operation in step SP14. More specifically, the calculation means 56 increases the degree of scrutinization by 10 if the time is within 0.2 seconds, increases the degree of scrutinization by 5 if the time is within 0.4 seconds, and does not increase the degree of scrutinization if the time exceeds 0.4 seconds. The processing then moves to the processing of step SP18.

Step SP18

The display means 52 refers to the object information in the advertisement information 50C and determines whether or not all of the objects (such as a total of 10 objects) have been displayed. If the determination is positive, the processing moves to the processing of step SP20. On the other hand, if the determination is negative, the processing moves to the processing of step SP12.

Step SP20

The display means 52 ends the display of the advertisement. The display means 52 may also end the display of the advertisement in response to an input operation from the player. The processing then moves to the processing of step SP22.

Step SP22

The provision means 58 provides content to the player. For example, the provision means 58 adds this provided content to the possessed character information or possessed item information in the player information 50A. More specifically, the provision means 58 provides a character with a rarity of 5 if the degree of scrutinization updated in step SP16 is 100, provides a character with a rarity of 4 if the degree of scrutinization is at least 50 and less than 100, and provides a resource item if the degree of scrutinization is 0 or more and less than 50. The calculation means 56 then initializes the degree of scrutinization in the player information 50A to zero. The processing then moves to the processing of step SP24.

Step SP24

The display means 52 causes the touch panel 32 to display a provision screen 70 showing the content provided to the player in step SP22.

Figure 7:
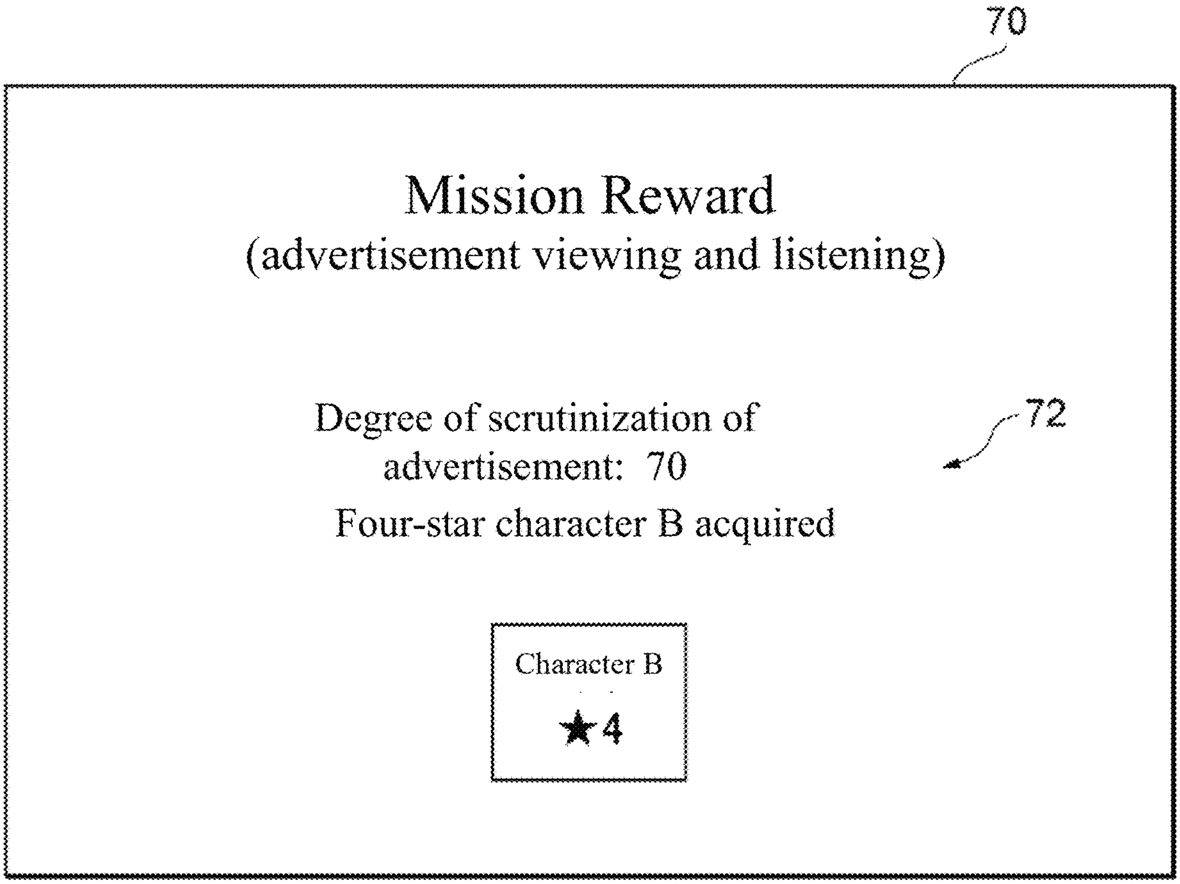
FIG. 7 is a diagram showing an example of a provision screen according to one or more embodiments.

FIG. 7 is a diagram showing an example of the provision screen 70 according to one or more embodiments.

As shown in FIG. 7, the provision screen 70 is provided with a provided information area 72. The provided information area 72 shows the degree of scrutinization of an advertisement by the player and the content provided.

The series of processing shown in FIG. 5 is then ended.

Effect

As described above, in one or more embodiments, a computer is made to function as the display means 52 for displaying an advertisement within a game that is different from those for that game, the calculation means 56 for calculating the degree of scrutinization indicating the degree to which the player has scrutinized an advertisement, and the provision means 58 for providing the content that can be used in the game to the player on the basis of the display of the advertisement, wherein the provision means 58 prioritizes the provided content in proportion to the degree of scrutinization.

With this configuration, the higher is the degree to which the player has scrutinized an advertisement, the more the content provided to the player is prioritized, so the sense of unfairness on the part of the player who has scrutinized the advertisement can be reduced.

Also, in one or more embodiments, the display means 52 displays one or more objects while an advertisement is being displayed, and the calculation means 56 calculates the degree of scrutinization according to the timing at which an input instruction for an object was given by the player.

With this configuration, the provided content is prioritized according to the timing at which the input instruction for the displayed object was given, which motivates the player to focus on the advertisements.

Also, in one or more embodiments, the calculation means 56 calculates the degree of scrutinization to be higher in proportion to how well the timing at which the object is displayed matches the timing at which the input instruction is given.

With this configuration, the provided content is prioritized in proportion to how well the timing at which the object is displayed matches the timing at which the input instruction is given, which motivates the player to focus on the advertisements.

In one or more embodiments, the display means 52 moves the display of an object toward a specific position, and the calculation means 56 calculates the degree of scrutinization to be higher in proportion to how well the timing at which the object reaches the specific position matches the timing at which the input instruction is given.

With this configuration, the provided content is prioritized in proportion to how well the timing at which the object reaches the specific position matches the timing at which the input instruction is given, which motivates the player to focus on the advertisements.

Also, in one or more embodiments, the display means 52 displays questions regarding an advertisement in response to the display of that advertisement, and the calculation means 56 calculates the degree of scrutinization according to the answers received from the player.

With this configuration, since the provided content is prioritized according to the player's answers to questions regarding the advertisements, this motivates the player to focus on the advertisements.

Also, in one or more embodiments, the calculation means 56 calculates the degree of scrutinization to be higher in proportion to how long the player spends looking at the advertisement.

With this configuration, the provided content is prioritized in proportion to how long the player spends looking at an advertisement, which motivates the player to focus on the advertisements.

Also, in one or more embodiments, the prioritization is to increase the amount of the content.

With this configuration, the higher is the degree of scrutinization, the more content is provided, which motivates the player to focus on the advertisements.

Also, in one or more embodiments, the prioritization is to increase the quality of the content.

With this configuration, the higher is the degree of scrutinization, the higher is the quality of the content provided, which motivates the player to focus on the advertisements.

Modifications

The present invention is not limited to or by the specific examples given above. Specifically, even if a person skilled in the art were to make appropriate design changes to the above embodiments, these would also be included in the scope of the present invention so long as it had the features of the present invention. Also, the elements included in the above embodiments and in the modification examples given below could be combined whenever technically possible, and such combinations would also be encompassed by the scope of the present invention so long as the features of the present invention are included.

For example, in one or more embodiments, a case was described in which the display means 52 displayed one or more objects while an advertisement was being displayed, but the display mode of the merchandise name included in the advertisement, the merchandise summary, the merchandise image, or the like may be changed. For example, instead of displaying an object, the display means 52 may change a text string such as the merchandise name included in an advertisement. Changes to the text string include, for example, changes to the font color, typeface, character size, character style, and so on. In this case, the calculation means 56 calculates the degree of scrutinization to be higher in proportion to how well the timing at which the display mode of the merchandise name or the like is changed by the display means 52 matches the timing at which the input instruction is given.

The display means 52 may display some or all of the merchandise name, the merchandise summary, the merchandise image, the name of the company that sells the merchandise, and so forth as objects. For example, the display means 52 displays the merchandise name (an object) from a state in which no merchandise name is included in the advertisement.

Also, the object may be an end button that ends the advertisement display. For example, the display means 52 displays the end button at the timing at which the reproduction of a moving image of the advertisement ends. Then, the calculation means 56 calculates the degree of scrutinization to be higher in proportion to how well the timing at which the end button is displayed by the display means 52 matches the timing at which the input instruction is given. The display means 52 then displays the content provision screen in response to an input instruction to the end button.

Also, the object may be a switch button for switching to a screen for purchasing the advertised merchandise. For example, if the advertised merchandise is an application for a smart device, the object may be a switch button for switching to a screen for installing that application. In this case, the calculation means 56 calculates the degree of scrutinization to be higher in response to an input instruction to the switch button or the purchase (installation) of the merchandise.

Also, in one or more embodiments, a case was described in which the display means 52 moved the display of the object toward a specific position, but the size of the object may be gradually changed instead. For example, the display means 52 gradually reduces the size of a circular object, changing the display until it overlaps a circular area indicating a specific position.

Also, in one or more embodiments, a case was described in which the reception means 54 received an input instruction (such as a touch operation) from the player at the timing at which an object was displayed, but a continued input instruction (such as a long press) may be received while the object is being displayed. In this case, the calculation means 56 calculates the degree of scrutinization to be higher in proportion to how well the timing from the start of the display of the object until the object disappears matches the timing from the start to the end of the input instruction (long press). The display of this object may be moved toward a specific position.

In one or more embodiments, a case was described in which the calculation means 56 increased the degree of scrutinization when a touch operation was performed at a display position where an object was displayed, but the degree of scrutinization may instead be increased regardless of whether or not a touch operation is performed at that display position. For example, the calculation means 56 may calculate the degree of scrutinization to be higher in proportion to how well the timing at which an object is displayed matches the timing at which a touch operation is performed in some region of the touch panel 32. Similarly, the calculation means 56 may calculate the degree of scrutinization in proportion to how well the timing at which the object, whose display is to be moved, reaches a specific position matches the timing at which a touch operation is performed in some region of the touch panel 32. In this case, the touch panel 32 may be provided with a dedicated operation region for receiving an operation input (such as a touch operation) on the object from the player.

Also, in one or more embodiments, a case was described in which the calculation means 56 increased the degree of scrutinization, but it may instead be decreased. For example, the calculation means 56 decreases the degree of scrutinization by 5 when no input instruction (such as a touch operation) is given within 0.5 seconds from the timing at which the object is displayed.

Also, in one or more embodiments, a case was described in which the provision means 58 prioritized the provided content in proportion to the degree of scrutinization calculated by the calculation means 56, but instead, a provided coupon (which can be used at a store, etc.) may be prioritized in proportion to the degree of scrutinization. For example, the provision means 58 increases the discount amount (discount rate) of the coupon or the number of products to be redeemed in proportion to the degree of scrutinization.

Also, the provision means 58 may choose the amount of the provided content according to the lottery probability based on the degree of scrutinization, and may provide the player with that chosen amount of content. This lottery probability is set such that the higher is the degree of scrutinization, the more likely it is that more content will be chosen.

Also, the provision means 58 may choose the type (quality) of the provided content according to the lottery probability based on the degree of scrutinization, and may provide the player with that chosen type of content. This lottery probability is set such that the higher is the degree of scrutinization, the more likely it is that high-quality content will be chosen.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . server device (computer), 12 . . . terminal device, 50 . . . storage means, 52 . . . display means, 56 . . . calculation means, 58 . . . provision means

What is claimed is:

1. An information processing method comprising:

in response to a touch operation on a touch sensor of a touch panel, modifying a display screen of the touch panel to display, during a game:

a merchandise advertisement screen including an advertisement content for a merchandise that is unrelated to the game; and an end button that ends displaying the merchandise advertisement screen;

while displaying the merchandise advertisement screen, capturing an eye of a player using a camera and obtaining a time duration during which the eye is captured;

detecting, by a central processing unit (CPU), a timing of a start to display the end button;

detecting, with the touch sensor, a timing of the touch operation on the end button;

calculating a time period from the timing of the start to display the end button to the timing of the touch operation on the end button;

calculating a degree of scrutinization that indicates a degree to which the player has scrutinized the advertisement content based on:

the time duration during which the eye is captured; and the time period from the timing of the start to display the end button to the timing of the touch operation on the end button, where the degree of scrutinization increases as the time period decreases;

based on the degree of scrutinization, modifying an information of the player to include a rewarded game content, to be used in the game; and in response to the end button being pressed, modifying the display screen to display:

a provision screen indicating the degree of scrutinization and the rewarded game content; and a game screen incorporating the rewarded game content into functionality of the game, wherein an amount or quality of the rewarded game content is proportional to the degree of scrutinization.

2. The information processing method according to claim 1, wherein the timing of the start to display the end button is a timing at which reproduction of a moving image of the advertisement content ends.

3. The information processing method according to claim 1, further comprising:

in response to the touch operation on the end button, displaying a content provision screen that provides a game content.

4. An information processing device comprising:

a controller that comprises a central processing unit (CPU) and that:

in response to a touch operation on a touch sensor of a touch panel, modifies a display screen of the touch panel to display, during a game:

a merchandise advertisement screen including an advertisement content for a merchandise that is unrelated to the game; and an end button that ends displaying the merchandise advertisement screen;

while displaying the merchandise advertisement screen, capturing an eye of a player using a camera and obtaining a time duration during which the eye is captured;

detects, by the CPU, a timing of a start to display the end button;

detects, with the touch sensor, a timing of the touch operation on the end button;

calculates a time period from the timing of the start to display the end button to the timing of the touch operation on the end button;

calculates a degree of scrutinization that indicates a degree to which the player has scrutinized the advertisement content based on:

the time duration during which the eye is captured; and the time period from the timing of the start to display the end button to the timing of the touch operation on the end button, where the degree of scrutinization increases as the time period decreases;

based on the degree of scrutinization, modifies an information of the player to include a rewarded game content, to be used in the game; and in response to the end button being pressed, modifies the display screen to display:

a provision screen indicating the degree of scrutinization and the rewarded game content; and a game screen incorporating the rewarded game content into functionality of the game, wherein an amount or quality of the rewarded game content is proportional to the degree of scrutinization.

5. A non-transitory computer-readable medium storing instructions, wherein when the instructions are executed, the instructions cause a controller that comprises a central processing unit (CPU) to execute operations comprising:

in response to a touch operation on a touch sensor of a touch panel, modifying a display screen of the touch panel to display, during a game:

a merchandise advertisement screen including an advertisement content for a merchandise that is unrelated to the game; and an end button that ends displaying the merchandise advertisement screen;

while displaying the merchandise advertisement screen, capturing an eye of a player using a camera and obtaining a time duration during which the eye is captured;

detecting a timing of a start to display the end button;

detecting a timing of the touch operation on the end button;

calculating a time period from the timing of the start to display the end button to the timing of the touch operation on the end button;

calculating a degree of scrutinization that indicates a degree to which the player has scrutinized the advertisement content based on:

the time duration during which the eye is captured; and the time period from the timing of the start to display the end button to the timing of the touch operation on the end button, where the degree of scrutinization increases as the time period decreases;

based on the degree of scrutinization, modifying an information of the player to include a rewarded game content, to be used in the game; and in response to the end button being pressed, modifying the display screen to display:

a provision screen indicating the degree of scrutinization and the rewarded game content; and a game screen incorporating the rewarded game content into functionality of the game, wherein an amount or quality of the rewarded game content is proportional to the degree of scrutinization.

* * * * *